United States Patent
Apostolopoulos et al.

(10) Patent No.: US 8,400,490 B2
(45) Date of Patent: Mar. 19, 2013

(54) FRAMING AN OBJECT FOR VIDEO CONFERENCE

(75) Inventors: John G. Apostolopoulos, Palo Alto, CA (US); Ramin Samadani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 12/916,505

(22) Filed: Oct. 30, 2010

(65) Prior Publication Data

US 2012/0105573 A1    May 3, 2012

(51) Int. Cl.
*H04N 7/14* (2006.01)

(52) U.S. Cl. ............... 348/14.08; 348/14.01; 348/14.12

(58) Field of Classification Search ...... 348/14.01–14.16
See application file for complete search history.

(56) References Cited

U.S. PATENT DOCUMENTS

| | | | |
|---|---|---|---|
| 5,687,249 A * | 11/1997 | Kato | 382/104 |
| 5,933,666 A * | 8/1999 | Dowe et al. | 396/378 |
| 7,561,191 B2 | 7/2009 | May et al. | |
| 2006/0072811 A1 * | 4/2006 | Porter et al. | 382/159 |
| 2008/0231726 A1 * | 9/2008 | John | 348/223.1 |
| 2010/0302344 A1 * | 12/2010 | Large et al. | 348/14.08 |
| 2010/0328659 A1 * | 12/2010 | Bodkin | 356/326 |
| 2011/0090303 A1 * | 4/2011 | Wu et al. | 348/14.16 |
| 2011/0316853 A1 * | 12/2011 | Bar-Zeev et al. | 345/420 |

FOREIGN PATENT DOCUMENTS

| | | |
|---|---|---|
| CN | 2789825 Y | 6/2006 |
| JP | 2004282535 A | 10/2004 |

* cited by examiner

*Primary Examiner* — Melur Ramakrishnaiah

(57) ABSTRACT

At least one camera lens captures a field of view comprising at least one object of interest, wherein the at least one camera lens is configured for extending the field of view in at least one direction. The at least one object of interest that is within said field of view is detected. Then, an image of a detected at least one object of interest is warped to fit within the field of view. A plurality of pixels surrounding the image of the detected at least one object of interest within the field of view is cropped such that, based on the warping and the cropping, the detected at least one object appears as centered within the field of view.

20 Claims, 5 Drawing Sheets

200A

RECEIVE IMAGE DATA CORRESPONDING TO AN IMAGE CAPTURED WITH AT LEAST ONE CAMERA LENS HAVING A FIELD OF VIEW COMPRISING AT LEAST ONE OBJECT OF INTEREST, THE AT LEAST ONE CAMERA LENS CONFIGURED FOR EXTENDING THE FIELD OF VIEW IN AT LEAST ONE DIRECTION
202

↓

DETECT THE AT LEAST ONE OBJECT OF INTEREST WITHIN THE FIELD OF VIEW
204

↓

PERFORM A WARPING PROCESS ON THE IMAGE OF THE AT LEAST ONE OBJECT OF INTEREST
206

↓

PERFORM A CROPPING PROCESS ON THE IMAGE OF THE AT LEAST ONE OBJECT OF INTEREST WITHIN THE FIELD OF VIEW SUCH THAT, BASED ON THE WARPING AND THE CROPPING, THE OBJECT WILL APPEAR AS CENTERED WITHIN A DISPLAY OF A RECEIVING USER
208

↓

PERIODICALLY REPEAT THE CAPTURING, THE DETECTING, THE WARPING AND THE CROPPING BASED ON MOVEMENT OF THE DEVICE
210

200A

```
RECEIVE IMAGE DATA CORRESPONDING TO AN IMAGE CAPTURED WITH AT LEAST ONE CAMERA LENS
HAVING A FIELD OF VIEW COMPRISING AT LEAST ONE OBJECT OF INTEREST, THE AT LEAST ONE
CAMERA LENS CONFIGURED FOR EXTENDING THE FIELD OF VIEW IN AT LEAST ONE DIRECTION
202
```

↓

DETECT THE AT LEAST ONE OBJECT OF INTEREST WITHIN THE FIELD OF VIEW
204

↓

PERFORM A WARPING PROCESS ON THE IMAGE OF THE AT LEAST ONE OBJECT OF INTEREST
206

↓

PERFORM A CROPPING PROCESS ON THE IMAGE OF THE AT LEAST ONE OBJECT OF INTEREST WITHIN
THE FIELD OF VIEW SUCH THAT, BASED ON THE WARPING AND THE CROPPING, THE OBJECT WILL
APPEAR AS CENTERED WITHIN A DISPLAY OF A RECEIVING USER
208

↓

PERIODICALLY REPEAT THE CAPTURING, THE DETECTING, THE WARPING AND THE CROPPING BASED
ON MOVEMENT OF THE DEVICE
210

> RECEIVE IMAGE DATA CORRESPONDING TO AN IMAGE CAPTURED WITH AT LEAST ONE CAMERA LENS HAVING A FIELD OF VIEW COMPRISING A FACE, THE AT LEAST ONE CAMERA LENS BEING CONFIGURED FOR EXTENDING THE FIELD OF VIEW IN AT LEAST ONE DIRECTION AND BEING COUPLED WITH A DEVICE, THE DEVICE BEING CONFIGURED FOR ENABLING VIDEO CONFERENCING
> 214

> DETECT THE FACE WITHIN THE FIELD OF VIEW
> 216

> PERFORM A WARPING PROCESS ON THE IMAGE OF THE FACE
> 218

> PERFORM A CROPPING PROCESS ON THE IMAGE OF THE FACE WITHIN THE FIELD OF VIEW SUCH THAT, BASED ON THE WARPING AND THE CROPPING, THE FACE WILL APPEAR AS CENTERED WITHIN A DISPLAY OF A RECEIVING USER
> 220

> CONTINUOUSLY TRACK A RELATIVE MOTION OF THE FACE AND THE DEVICE
> 222

> DYNAMICALLY REFRESH THE IMAGE PERIODICALLY BY REPEATING THE CAPTURING, THE DETECTING, THE PERFORMING THE WARPING PROCESS AND THE PERFORMING THE CROPPING PROCESS BASED UPON THE RELATIVE MOTION OF THE FACE AND THE DEVICE
> 224

> DETECT THE FACE WITHIN THE FIELD OF VIEW UTILIZING AT LEAST ONE SENSOR OF A GROUP OF SENSORS CONSISTING OF: AN ACCELEROMETER; A GYROSCOPE; AND A DEPTH SENSOR
> 226

FIG. 2B

FRAMING AN OBJECT FOR VIDEO CONFERENCE

BACKGROUND

Video conferencing is quickly gaining in popularity due to, in part, the availability of free and/or high quality video conferencing applications. For personal computer or notebook based video conferencing, a camera may be placed on top of a monitor or built into the notebook screen for capturing video. In order for a person to be seen at the other end of the video conference call, that person must stay within the camera's field of view.

DESCRIPTION OF THE DRAWINGS

FIG. 2A is a flow diagram of a method for framing an object for video conferencing, according to one embodiment of the present technology.

FIG. 2B is a flow diagram of a method for framing a face for video conferencing, according to one embodiment of the present technology.

Figure 1A:
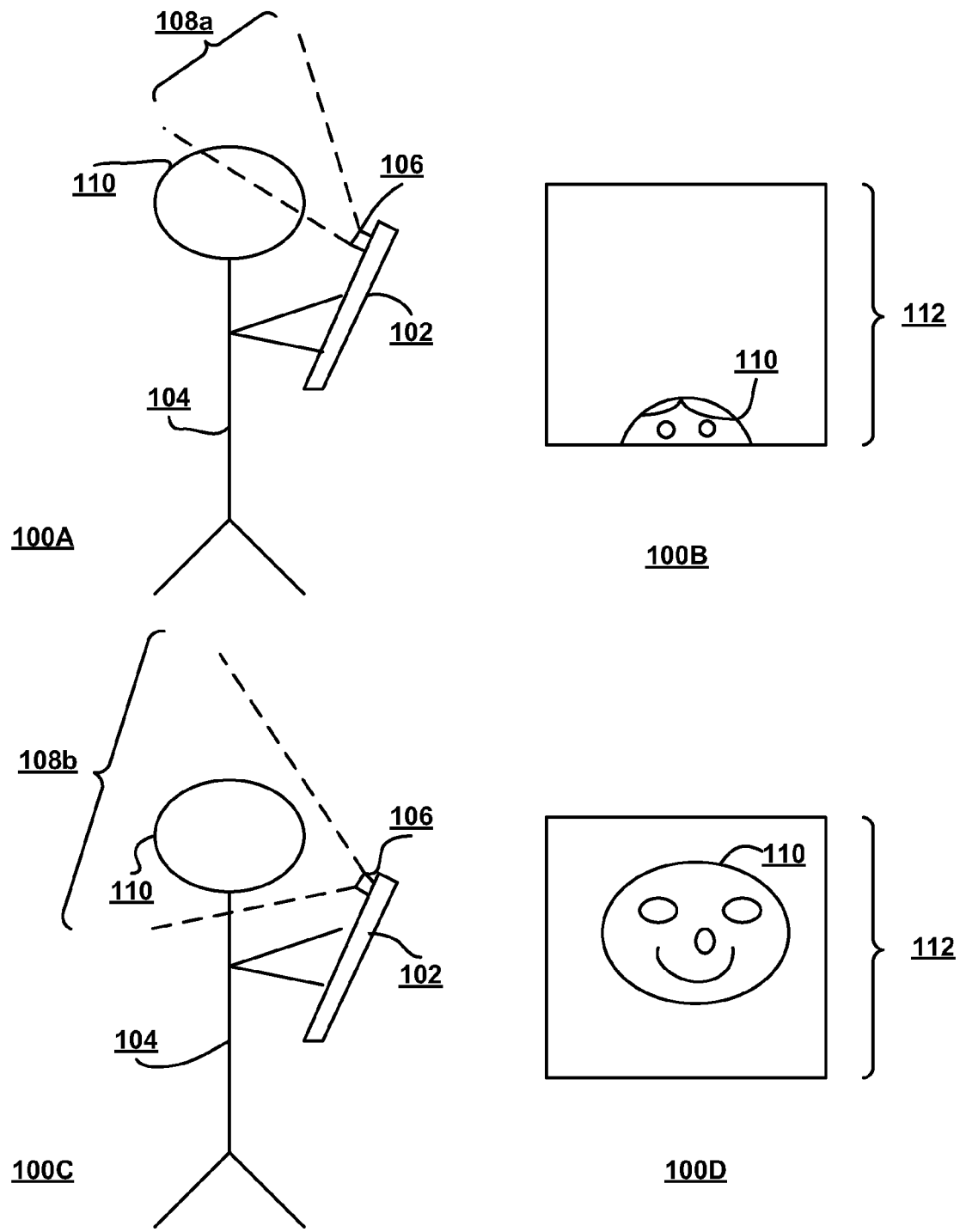
FIG. 1A is a diagram showing a slate/tablet with a built in camera being used as part of a video conference. 100A of FIG. 1A shows a user holding the slate/tablet at an angle and the result 100B thereof. 100C of FIG. 1A shows a user holding a slate/tablet at an angle and the result 100D thereof.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "capturing", "detecting", "cropping", "extending", "repeating", "performing", "refreshing", "tracking", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical computers.

The discussion will begin with a brief overview of video conferencing. The discussion will then focus on embodiments of the present technology that provide a system and method for framing an object for video conferencing.

Overview

In general, videoconferencing entails conducting a conference between two or more participants at different sites by using computer networks to transmit audio and video data. For example, a point-to-point (two-person) video conferencing system works much like a video telephone. In one approach, each participant has a video camera, microphone, and speakers mounted on his or her computer. As the two participants speak to one another, their voices are carried over the network and delivered to the other's speakers. Whatever images appear in front of the video camera appear in a window on the other participant's monitor. Additionally, videoconferencing allows more than two participants to sit in a virtual conference room and communicate as if they were sitting right next to each other.

Currently, cameras may be attached to personal computers, notebooks, etc, for video conferencing. However, the participants must stay within the field of view of the camera so that they can be seen by the participants on the other end of the call. Slates, tablets, and similar products are likely to become quite popular in the future. The construction of these slim, light and portable computers enables a user to easily move these computers. As a result, a slate with a built in conventional camera, theoretically, is likely to be moved during a video conference, causing the recipient to experience undesirable framing of the video, where objects are in undesired locations and size in the video, and shake in the video.

In contrast, a computer with a built in camera (or attached) that remains in a fixed position on a desk will be more functional while using the video conferencing because there will be no framing problems or "shake" due to movement. However, the built in cameras that are in a fixed position also have a fixed viewing angle. For example, for a notebook, the camera view is almost perpendicular to the screen, often having a slightly upward angle.

With reference to 100A of FIG. 1A, an example of a user 104 using a slate/tablet 102 is described, while a slate/tablet 102 may be held at any angle a user 104 prefers for viewing, the attached camera 106 also has a fixed field of view 108a. This means that often the user 104 holding the slate/tablet 102 is not appropriately within the camera's 106 field of view 108a. This would result in a highly undesirable user experience. For example and referring to 100B, portions of the user's head 110 may be cut off within the screened image 112 being sent to another participant of the video conferencing or the video may be of the user's Adam's Apple.

Current approaches to overcome these limitations include, as mentioned, a camera being fixed in a device with a fixed view of scene (field of view). Often, the center axis of the camera is perpendicular to the screen. In another approach, the camera is movable, many times in one direction. Thus, the end user moves in order to physically move the camera to place him/herself in the center of the video. This requires the camera to be movable, the user to move it, and perhaps periodically readjust it. Further, this also requires a mirror capability in which the video captured by the camera is shown to the user so that the user knows how to position him/herself to be in the center of the video.

In one more approach, a camera is used as an external device that is attached to a notebook screen, monitor, etc. The external device may generally be moved by the user in two directions. However, this type of external device also requires the camera to be physically moved, a user to move and readjust it.

With reference now to 100C of FIG. 1A, an example of a slate/tablet 102 being held at an angle that a user 104 prefers for viewing is shown, wherein the attached camera 106 has a fixed field of view 108b. In this example, the user 104 is holding the slate/tablet 102 in such a way so as to focus the camera's 106 field of view 108b on the user's 104 entire head 110. Referring now to 100D, this results in the entirety of the head 110 of the user 104 being within the screened image 112 that is transmitted to another video conferencing participant.

Embodiments of the present technology significantly improve a user's experience for video conferencing using a slate/tablet by providing accurate framing, without requiring user involvement. Even as the user moves the slate/tablet to different positions, such as changing the angle at which it is held, embodiments automatically capture and center an image of an object of interest (e.g., a face) within the field of view and send it to other participants of the video conference.

In brief, in one embodiment, a camera lens captures a viewing area that includes an object of interest, such as the user's face. The camera lens, such as a fish-eye lens, is able to extend a viewing area in which the face is located. With the aid of a face detection program, an image of the face is detected within that field of view. The image is then warped and cropped to fit within the field of view in order to appear centered. Additionally, the image of the face is detected, warped, and cropped dynamically, such that a user intervention is not required. For example, it is not necessary for a user to physically move the camera lens (or the device to which it is attached) in order to receive full head coverage. Thus, embodiments of the present technology enable the dynamic capturing of an image of a person's face without requiring any help from the end user.

The following discussion will begin with a description of the structure of the components of the present technology. The discussion will then be followed by a description of the components in operation.

Structure

Figure 1B:
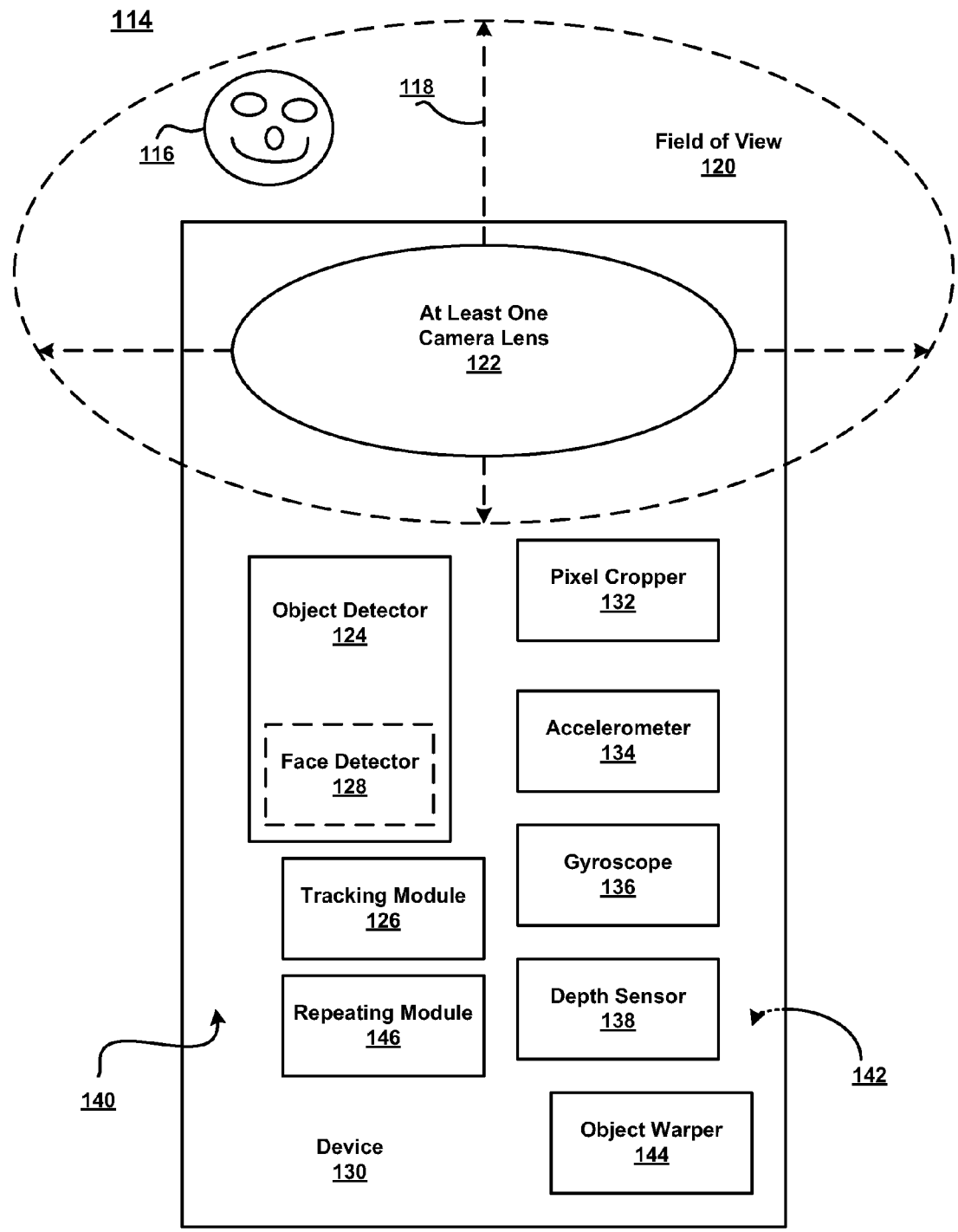
FIG. 1B is a block diagram of a system for framing an object for video conferencing, according to one embodiment of the present technology.

FIG. 1B is a block diagram of a system 114 for framing an object 116 for video conferencing, according to one embodiment of the present technology. Referring now to FIG. 1B, the system 114 includes at least one camera lens 122, an object detector 124, an object warper 144 and a pixel cropper 132. In other embodiments, the system 114 may also include a tracking module 126, a repeating module 146, an accelerometer 134, a gyroscope 136, a magnetometer, a GPS or other location device, and/or a depth sensor 138. It should be noted that the components described herein may be integrated within a single structure or distributed across different structures.

In one embodiment, the system 114 may include just one camera lens 122 or more than one camera lens. For purposes of brevity and clarity, the at least one camera lens 122 will be referred to herein, unless noted otherwise, as the camera lens 122. In one embodiment, the camera lens 122 is configured for capturing a field of view 120 that includes an object 116 of interest. The camera lens 122 is also configured for extending the field of view in at least one direction 118.

In one embodiment, the camera lens 122 is coupled with a device 130. The device 130 is configured for enabling video conferencing. For example, the device 130 may be portable or non-portable and may be, but is not limited to, a cell phone, a slate, a tablet, a notebook, etc.

Further, in one embodiment, the camera lens 122 may be, but is not limited to, a fish-eye camera lens, a cylindrical camera lens, or a customized camera lens. The fish-eye camera lens is able to extend the field of view 120 in both the vertical and horizontal directions. However, since the fish-eye camera lens sometimes encounters image quality problems due to its non-uniform sampling, a cylindrical camera lens that extends the field in just one direction 118 may also be used. To give an example of the usefulness of the cylindrical camera lens in an embodiment of the present technology, take the situation in which a user holding a slate with a built in camera lens tilts the slate along one direction 118. This direction would be considered to be the direction of orientation. The camera lens 122, such as a cylindrical camera lens, is able to extend the field of view 120 along this tilt direction, thus capturing all objects 116 within this tilt direction, including the user's face. The customized camera lens may be such a camera lens that includes some of the characteristics of the fish-eye camera lens and the cylindrical camera lens.

In one embodiment, a camera lens 122 is an original equipment manufacture camera (OEM) camera lens that is built into the device 130. In another embodiment, the camera lens 122 is a snap-on lens. For example, a camera lens 122 that is configured to be coupled with the device 130 may be snapped onto the device 130, and then function for framing an object 116 for video conferencing.\

In one embodiment, sensors such as an accelerometer 134, a gyroscope 136, a magnetometer, a global positioning system (GPS) or other location sensing device, or a depth sensor 138 are coupled with the camera lens 122. These sensors ultimately reduce the number of searches needed for detecting a face and make these searches more accurate. For example, a sensor may sense that a device 130 is tilted at a particular angle along a particular axis over a certain period of time. A gyroscope 136, for instance, would be able to predict the location of a face, based on the tilt angle and the time elapsed. This prediction greatly increases the efficiency of searches occurring while detecting a face. Thus, these sensors can greatly reduce the use of power and increase the speed and efficiency of the system 114.

As another example, consider that we are looking for a particular building and we know the location of that building (via its address or search enging maps coordinates). The device can use GPS or other location sensing method to determine its location, and via the magnetometer it can determine where in the camera view (what direction, e.g., north-east) to look to detect the building. This can dramatically increase the efficiency of searching for the building.

The accelerometer 134, the functioning of which is well known in the art, indicates whether the device 130, and hence the attached camera lens 122, is being held horizontally or vertically through the sensing of gravity. In another embodiment, the gyroscope 136, the functioning of which is well known in the art, senses rotation and indicates which way the device 130, and hence the attached camera lens 122, is oriented. In one embodiment, the depth sensor 138, the functioning of which is well known in the art, is used to detect the distance between the camera lens 122 and the face and ultimately help indicate where the face is located within the field of view 120.

In one embodiment, the object detector 124 detects at least one object 116 of interest (hereinafter, "object 116" unless specifically noted otherwise) that is within the field of view 120. In one embodiment, an object 116 of interest is a face. However, it should be noted that the object 116 of interest may be any object 116 that may be represented by an image within a field of view 120. In one embodiment, the object detector 124 is a face detector 128. The face detector 128 functions as a face detector program, a variety of which are well known in the art.

In one embodiment and as will be described herein, the tracking module 126 continuously tracks a relative motion of the at least one object 116 of interest and the device 130. In one embodiment, based on the relative motion, the system 114 periodically repeats the capturing, the extending, the detecting, the performing a warping process and the performing a cropping process, such that a desired view of the at least one object 116 of interest is provided.

A face detector 128 or an object detector 124 may be combined with other ways to detect activity within a field of view 120, such as with feature tracking approaches (which are well known in the art). For example, in one embodiment, global motion and/or local motion is detected.

In one embodiment the detector may track multiple objects. For example, multiple faces within the field of view of the camera.

In one embodiment, the object warper 144 is configured for performing a warping process on the image of the object 116 of interest, using methods well known in the art. The warping can take into account a priori knowledge about the object being tracked. For example, the 3D shape of a face or building. For example, a face has two eyes, a nose, and a mouth, and there has been significant prior research (e.g., ACM SIGGRAPH conference) on how to render these features to make them as pleasing and natural as possible. Similarly, typical buildings consist of many straight lines (vertical walls, floors, windows, etc), and we know that after warping these should also be straight lines. A variety of methods well known in the art may be applied to perform the warping. The warping may also take into account a priori knowledge of geometrical distortions due to the fisheye or cylindrical lenses.

In one embodiment, the pixel cropper 132 is configured for performing a cropping process on the image of the object 116 of interest within the field of view 120 such that the object 116 of interest will appear as centered within a display of a receiving user. In one embodiment, a plurality of pixels surrounding the image of the object 116 is cropped. For example, assume that the detected object is found to be towards the right hand side of the field of view 120. The pixels surrounding the image will be cropped such that the image (e.g., the face) appears to be substantially alone. Thus, the functioning of the object warper 144 and the pixel cropper 132 together cause the object 116 to appear as centered within a display of a receiving user.

In one embodiment, a repeating module 146 is configured for periodically repeating the capturing, the extending, the detecting, the warping and the cropping based on the relative motion of the device 130. For example, when the device 130 is moved (e.g., a camera is moved), embodiments of the present technology periodically dynamically capture, detect, warp, and crop the image such that the image continuously remains centered within the field of view 120. For example, the movement of the device may be sensed (e.g., using any of accelerometer, gyroscope, magnetometer, etc) and this information may be used to facilitate the tracking of the object. Every iteration may involve warping and cropping of the image. However, it may be the case in which a warping process is begun, but is not actually needed. In this situation, the warping process ends and the method for framing an object for video conferencing is continued. In another embodiment, it might be the case in which a cropping process is begun, but is not actually needed. In this situation, the cropping process ends and the method for framing an object for video conferencing is continued. Further, in one embodiment, the warped and cropped image is processed by methods well known in the art, such that the distortion caused by the image warping is substantially overcome.

In one embodiment, two camera lenses are coupled with a device 130. For example, one camera lens is coupled with a first side 140 of a cell phone. Another camera lens is coupled with a second side 142 of the phone, the second side 142 being opposite the first side 140 of the cell phone. This embodiment enables a user to video conference himself into a conference call with one of the camera lenses, while also sharing images captured by the second camera lens. Thus, given embodiments of the present technology, if a user bends down with his cell phone, and therefore tilts it downward, to capture an image of a flower, the entire face of the user would still be captured and remain in tact, even though the angle of device has changed.

Thus, embodiments of the present technology enable users to easily transmit their image during video conference without interruption or intervention on their part. Further, since embodiments repeatedly re-center an image of a detected object, even if a cell phone with a built in camera lens 122 is moved, a user still experiences accurate framing and therefore a pleasant video conferencing experience.

Operation

FIG. 2A is a flow diagram of a method 200A implemented by a computer (see 300 of FIG. 3) for framing an object 116 for video conferencing. The method 200A is described below with reference to FIG. 1.

At 202, in one embodiment and as described herein, the method 200A receives image data corresponding to an image captured with at least one camera lens 122 having a field of view 120 comprising the object 116 of interest. The camera lens 122 is configured for extending the field of view 120 in at least one direction 118. At 204, in one embodiment and as described herein, the method 200A detects the object 116 of interest within the field of view 120.

At 206, in one embodiment and as described herein, the method 200A performs a warping process on the image of the object 116 of interest. For example, in one embodiment, image processing on the image is performed to substantially overcome distortion caused by the camera lens. At 208, in one embodiment and as described herein, the method 200A performs a cropping process on the image of the object 116 of interest within the field of view such that, based on the warping and the cropping, the object 116 will appear as centered within a display of a receiving user. The display of the receiving user is one that is configured for receiving video as part of videoconferencing. For example, a plurality of pixels surrounding the image of the object of interest within the field of view 120 are cropped.

At 210, in one embodiment and as described herein, the method 200A periodically repeats the capturing of 202, the detecting of 204, the warping of 206 and the cropping of 208 based on movement of the device 130. For example, when the device 130 is moved, either intentionally or unintentionally, the system 114 self-adjusts. In other words, the system 114 dynamically repeats the method described herein in order to re-center the detected object within the field of view 120. The method can adapt to both movement of the device and/or the object being tracked. Note that the object can move while the device is held still (not moving), the object may be still while the device moves, or both the object and device move. The tracking can be done most efficiently and robustly by tracking both movement of the device and movement of the object (e.g., face). For example, the device movement may be tracked by a gyroscope, accelerometer, magnetometer, etc. The object movement may be tracked by estimating the object's motion from frame to frame using the captured visual data (e.g., by conventional motion estimation, optical flow, or object tracking techniques). The method may therefore continuously track the relative motion of the object of interest and the device (camera) and continuously adapt the processing to provide the desired view of the object.

FIG. 2B is a flow diagram of a method 200B. In one embodiment, method 200B is embodied in instructions, stored on a non-transitory computer-readable storage medium, which when executed by a computer system (see 300 of FIG. 3), cause the computer system to perform the method 200B for framing an object 116 for video conferencing. The method 200B is described below with reference to FIG. 1.

At 214, in one embodiment and as described herein, the method 200B receives image data corresponding to an image captured with at least one camera lens 122 having a field of view 120 comprising a face. The camera lens 122 is configured for extending the field of view 120 in at least one direction 118. Further, the camera lens 122 is configured for being coupled with a device 130, wherein the device 130 is configured for enabling video conferencing. At 216, in one embodiment and as described herein, the method 200B detects the face that is within the field of view 120.

At 218, in one embodiment and as described herein, the method 200B performs a warping process on the image of the face. At 220, in one embodiment and as described herein, the method 200B performs a cropping process on the image of the face within the field of view such that, based on the warping and the cropping, the detected face will appear as centered within a display of a receiving user.

At 222, in one embodiment and as described herein, the method 200B continuously tracks a relative motion of the face and the device 130. At 224, in one embodiment, the method 200B dynamically refreshes the image periodically by repeating the capturing of 214, the detecting of 216, the warping of 218 and the cropping of 220 based on movement of the device 130.

At 226, in one embodiment and as described herein, the method 200B detects the face that is within the field of view 120 utilizing at least one sensor of a group of sensors consisting of: an accelerometer 134; a gyroscope 136; and a depth sensor 138.

Example Computer System Environment

Figure 3:
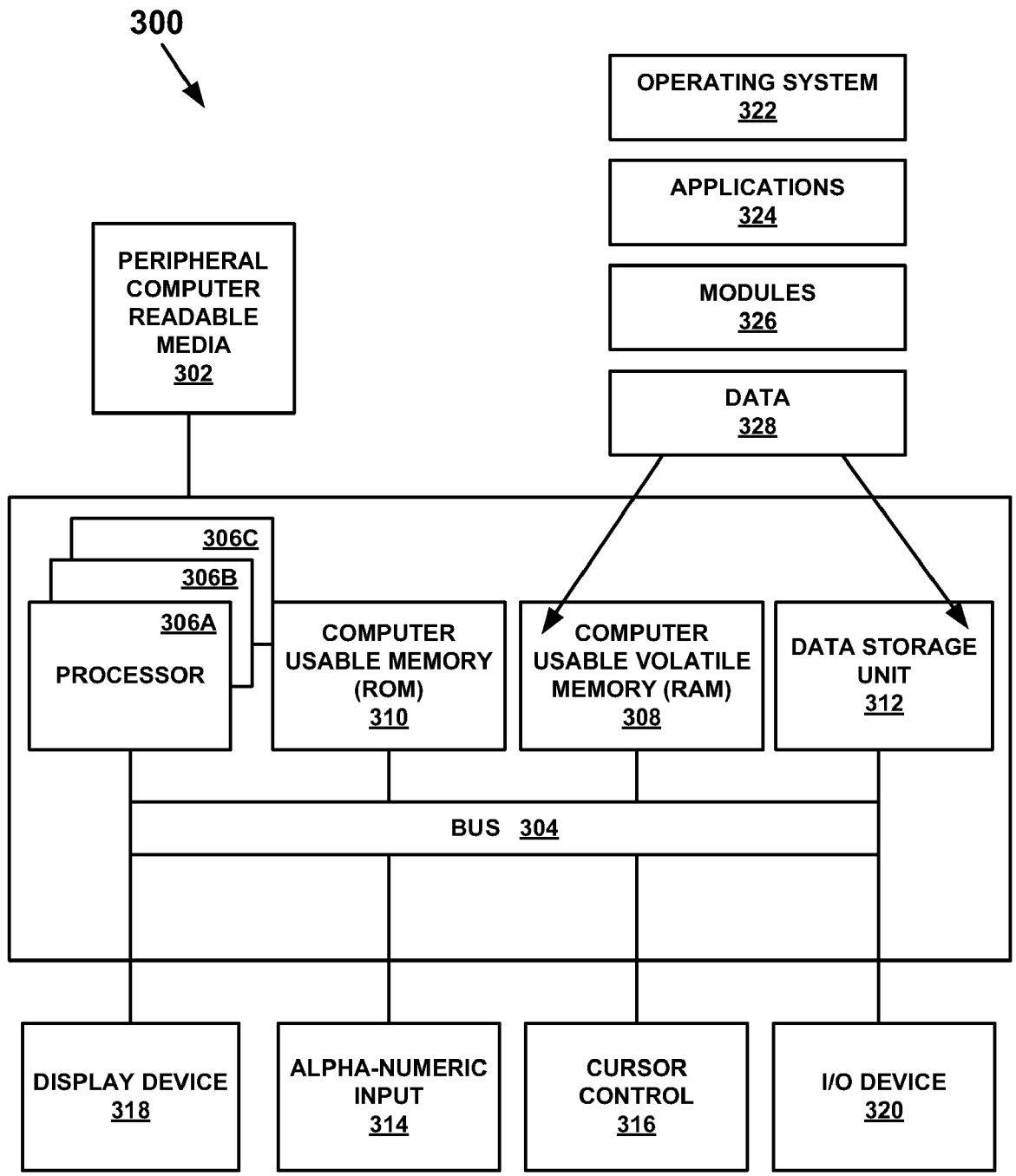
FIG. 3 is a diagram of an example computer system used for framing an object for video conferencing, according to one embodiment of the present technology.

With reference now to FIG. 3, portions of the technology for framing an object for video conferencing are composed of computer-readable and computer-executable instructions that reside, for example, in computer-usable media of a computer system. That is, FIG. 3 illustrates one example of a type of computer that can be used to implement embodiments, which are discussed below, of the present technology.

FIG. 3 illustrates an example computer system 300 used in accordance with embodiments of the present technology. It is appreciated that system 300 of FIG. 3 is an example only and that the present technology can operate on or within a number of different computer systems including general purpose networked computer systems, embedded computer systems, routers, switches, server devices, user devices, various intermediate devices/artifacts, stand alone computer systems, and the like. As shown in FIG. 3, computer system 300 of FIG. 3 is well adapted to having peripheral computer readable media 302 such as, for example, a floppy disk, a compact disc, and the like coupled thereto.

System 300 of FIG. 3 includes an address/data bus 304 for communicating information, and a processor 306A coupled to bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. System 300 also includes data storage features such as a computer usable volatile memory 308, e.g. random access memory (RAM), coupled to bus 304 for storing information and instructions for processors 306A, 306B, and 306C.

System 300 also includes computer usable non-volatile memory 310, e.g. read only memory (ROM), coupled to bus 304 for storing static information and instructions for processors 306A, 306B, and 306C. Also present in system 300 is a data storage unit 312 (e.g., a magnetic or optical disk and disk drive) coupled to bus 304 for storing information and instructions. System 300 also includes an optional alphanumeric input device 314 including alphanumeric and function keys coupled to bus 304 for communicating information and command selections to processor 306A or processors 306A, 306B, and 306C. System 300 also includes an optional cursor control device 316 coupled to bus 304 for communicating user input information and command selections to processor 306A or processors 306A, 306B, and 306C. System 300 of the present embodiment also includes an optional display device 318 coupled to bus 304 for displaying information.

Referring still to FIG. 3, optional display device 318 of FIG. 3 may be a liquid crystal device, cathode ray tube, plasma display device or other display device suitable for creating graphic images and alphanumeric characters recognizable to a user. Optional cursor control device 316 allows the computer user to dynamically signal the movement of a visible symbol (cursor) on a display screen of display device 318. Many implementations of cursor control device 316 are known in the art including a trackball, mouse, touch pad, joystick or special keys on alpha-numeric input device 314 capable of signaling movement of a given direction or manner of displacement. Alternatively, it will be appreciated that a cursor can be directed and/or activated via input from alpha-numeric input device 314 using special keys and key sequence commands.

System 300 is also well suited to having a cursor directed by other means such as, for example, voice commands. System 300 also includes an I/O device 320 for coupling system 300 with external entities. For example, in one embodiment, I/O device 320 is a modem for enabling wired or wireless communications between system 300 and an external network such as, but not limited to, the Internet. A more detailed discussion of the present technology is found below.

Referring still to FIG. 3, various other components are depicted for system 300. Specifically, when present, an operating system 322, applications 324, modules 326, and data 328 are shown as typically residing in one or some combination of computer usable volatile memory 308, e.g. random access memory (RAM), and data storage unit 312. However, it is appreciated that in some embodiments, operating system 322 may be stored in other locations such as on a network or on a flash drive; and that further, operating system 322 may be accessed from a remote location via, for example, a coupling to the internet. In one embodiment, the present technology, for example, is stored as an application 324 or module 326 in memory locations within RAM 308 and memory areas within data storage unit 312. The present technology may be applied to one or more elements of described system 300. For example, a method for identifying a device associated with a transfer of content may be applied to operating system 322, applications 324, modules 326, and/or data 328.

The computing system 300 is only one example of a suitable computing environment and is not intended to suggest any limitation as to the scope of use or functionality of the present technology. Neither should the computing environment 300 be interpreted as having any dependency or requirement relating to any one or combination of components illustrated in the example computing system 300.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What we claim is:

1. A computer-implemented method for framing an object for video conferencing, said method comprising:
   receiving image data corresponding to an image captured with at least one camera lens having a field of view comprising at least one object of interest, said at least one camera lens configured for extending said field of view in at least one direction;
   detecting said at least one object of interest within said field of view;
   performing a warping process on said image of said at least one object of interest, and
   performing a cropping process on said image of said at least one object of interest within said field of view such that, based on said warping and said cropping, said object will appear as centered within a display of a receiving user.

2. The computer-implemented method of claim 1, further comprising:
   periodically repeating said capturing, said detecting, said warping and said cropping based on movement of a device.

3. The computer-implemented method of claim 1, wherein said detecting at least one object of interest within said field of view comprises:
   detecting a face within said field of view.

4. The computer-implemented method of claim 3, wherein said detecting a face within said field of view comprises:
   detecting a face within said field of view and tracking it utilizing at least one of the following: an accelerometer and a gyroscope.

5. The computer-implemented method of claim 1, wherein said detecting at least one object of interest within said field of view comprises:
   detecting said at least one object of interest within said field of view utilizing at least one sensor of a group of sensors consisting of: an accelerometer; a gyroscope; and a depth sensor.

6. A system comprising:
   at least one camera lens configured for capturing a field of view comprising at least one object of interest and extending said field of view in at least one direction;
   an object detector configured for detecting said at least one object of interest within said field of view;
   an object warper configured for performing a warping process on an image of said at least one object of interest; and
   a pixel cropper configured for performing a cropping process on said image of said at least one object of interest within said field of view such that, based on said warping and said cropping, said at least one object of interest appears as centered within a display of a receiving user.

7. The system of claim 6, further comprising:
   a tracking module configured for continuously tracking a relative motion of said at least one object of interest and a device; and
   periodically repeating said capturing, said extending, said detecting, said performing a warping process and said performing a cropping process based on said relative motion of said device to provide a desired view of said at least one object of interest.

8. The system of claim 6, further comprising:
   an accelerometer coupled with said at least one camera lens.

9. The system of claim 6, further comprising:
   a gyroscope coupled with said at least one camera lens.

10. The system of claim 6, further comprising:
    a depth sensor coupled with said at least one camera lens.

11. The system of claim 6, wherein said at least one camera lens is a snap on camera lens configured for coupling with a device, said device being configured for enabling video conferencing.

12. The system of claim 6, wherein said at least one camera lens is an original equipment manufacture camera lens that is built into a device that is configured for enabling video conferencing.

13. The system of claim 6, wherein said at least one camera lens is a fish-eye camera lens.

14. The system of claim 6, wherein said at least one camera lens is a cylindrical camera lens.

15. The system of claim 6, wherein said at least one camera lens is a customized camera lens.

16. The system of claim 6, wherein said object detector comprises a face detector.

17. The system of claim 6, wherein said at least one camera lens is coupled with a device, said device being configured for enabling video conferencing.

18. The system of claim 6, wherein a first camera lens of said at least one camera lens is positioned on a first side of a device, and a second camera lens of said at least one camera lens is positioned on a second side of said device.

19. A non-transitory computer-readable storage medium comprising instructions stored thereon which, when executed by a computer system, cause said computer system to perform a method for framing a face for video conferencing, said method comprising:
    receiving image data corresponding to an image captured with at least one camera lens having a field of view comprising a face, said at least one camera lens being configured for extending said field of view in at least one direction and being coupled with a device, said device being configured for enabling video conferencing;

detecting said face within said field of view;

performing a warping process on said image of said face;

performing a cropping process on said image of said face within said field of view such that, based on said warping and said cropping, said face will appear as centered within a display of a receiving user;

continuously tracking a relative motion of said face and said device; and dynamically refreshing said image periodically by repeating said capturing, said detecting, said performing a warping process and said performing a cropping process based upon said relative motion.

20. The method of claim 19, wherein said detecting said face that is within said field of view comprises:

detecting said face within said field of view utilizing at least one sensor of a group of sensors consisting of: an accelerometer; a gyroscope; and a depth sensor.

* * * * *

UNITED STATES PATENT AND TRADEMARK OFFICE
CERTIFICATE OF CORRECTION

| | | |
|---|---|---|
| PATENT NO. | : 8,400,490 B2 | Page 1 of 1 |
| APPLICATION NO. | : 12/916505 | |
| DATED | : March 19, 2013 | |
| INVENTOR(S) | : John G. Apostolopoulos et al. | |

It is certified that error appears in the above-identified patent and that said Letters Patent is hereby corrected as shown below:

Title page, Item (54), and in the Specification, column 1, line 2, Title, delete "CONFERENCE" and insert -- CONFERENCING --, therefor.

In the Claims

In column 9, line 45, in Claim 1, delete "interest," and insert -- interest; --, therefor.

In column 10, line 37, in Claim 11, delete "snap on" and insert -- snap-on --, therefor.

In column 12, line 5, in Claim 20, delete "method" and insert -- medium --, therefor.

Signed and Sealed this
Twelfth Day of November, 2013

Teresa Stanek Rea
*Deputy Director of the United States Patent and Trademark Office*